(No Model.) 3 Sheets—Sheet 1.

F. M. CLARK & F. R. LOW.
POWER METER.

No. 401,929. Patented Apr. 23, 1889.

WITNESSES. INVENTORS.

(No Model.) 3 Sheets—Sheet 2.

F. M. CLARK & F. R. LOW.
POWER METER.

No. 401,929. Patented Apr. 23, 1889.

WITNESSES.

INVENTORS.

(No Model.) 3 Sheets—Sheet 3.

F. M. CLARK & F. R. LOW.
POWER METER.

No. 401,929. Patented Apr. 23, 1889.

WITNESSES.
J. M. Dolan,
H. B. Emery.

INVENTORS
Frank M. Clark
Fred R. Low
by their attys
Clarke & Raymond

UNITED STATES PATENT OFFICE.

FRANK M. CLARK, OF TILTON, NEW HAMPSHIRE, AND FREDERICK R. LOW, OF CHELSEA, MASSACHUSETTS.

POWER-METER.

SPECIFICATION forming part of Letters Patent No. 401,929, dated April 23, 1889.

Application filed June 22, 1888. Serial No. 277,864. (No model.)

*To all whom it may concern:*

Be it known that we, FRANK M. CLARK, of Tilton, in the county of Belknap and State of New Hampshire, and FREDERICK R. LOW, of Chelsea, in the county of Suffolk and State of Massachusetts, have invented a new and useful Improvement in Power-Meters, of which the following, reference being had to the accompanying drawings, is a full, accurate, and complete description, sufficient to enable one skilled in the art to make and use the same.

Figure 1:
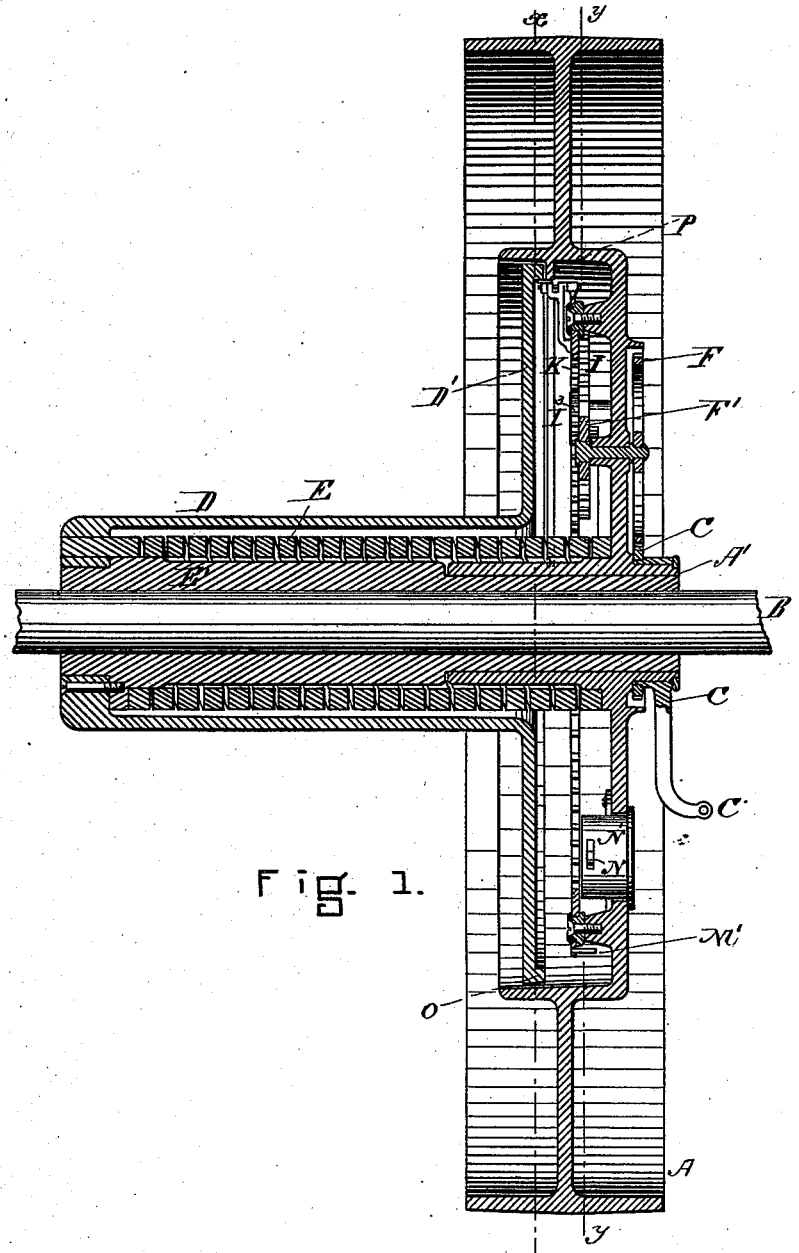
Figure 2:
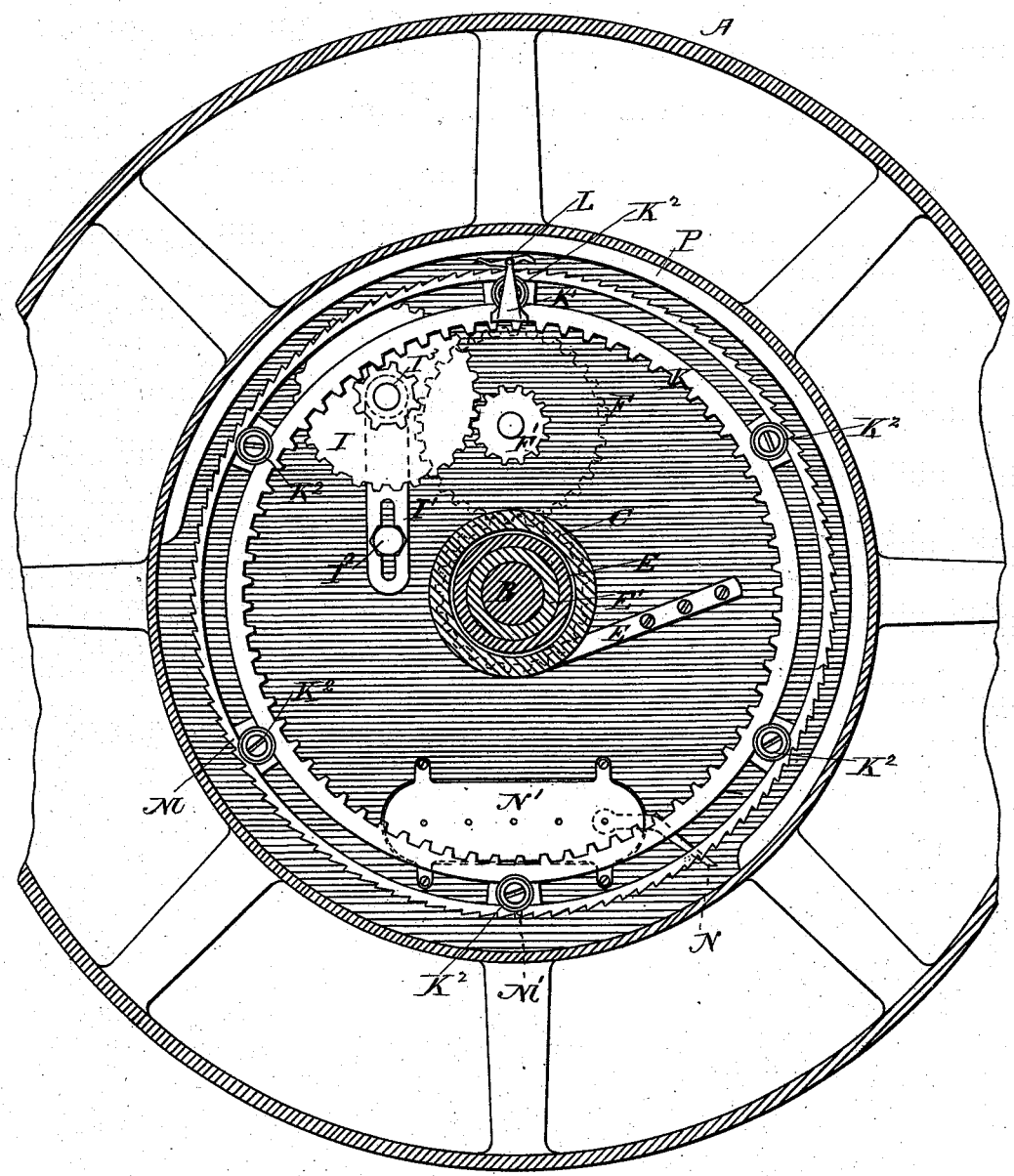
Figures 3, 4, 5:
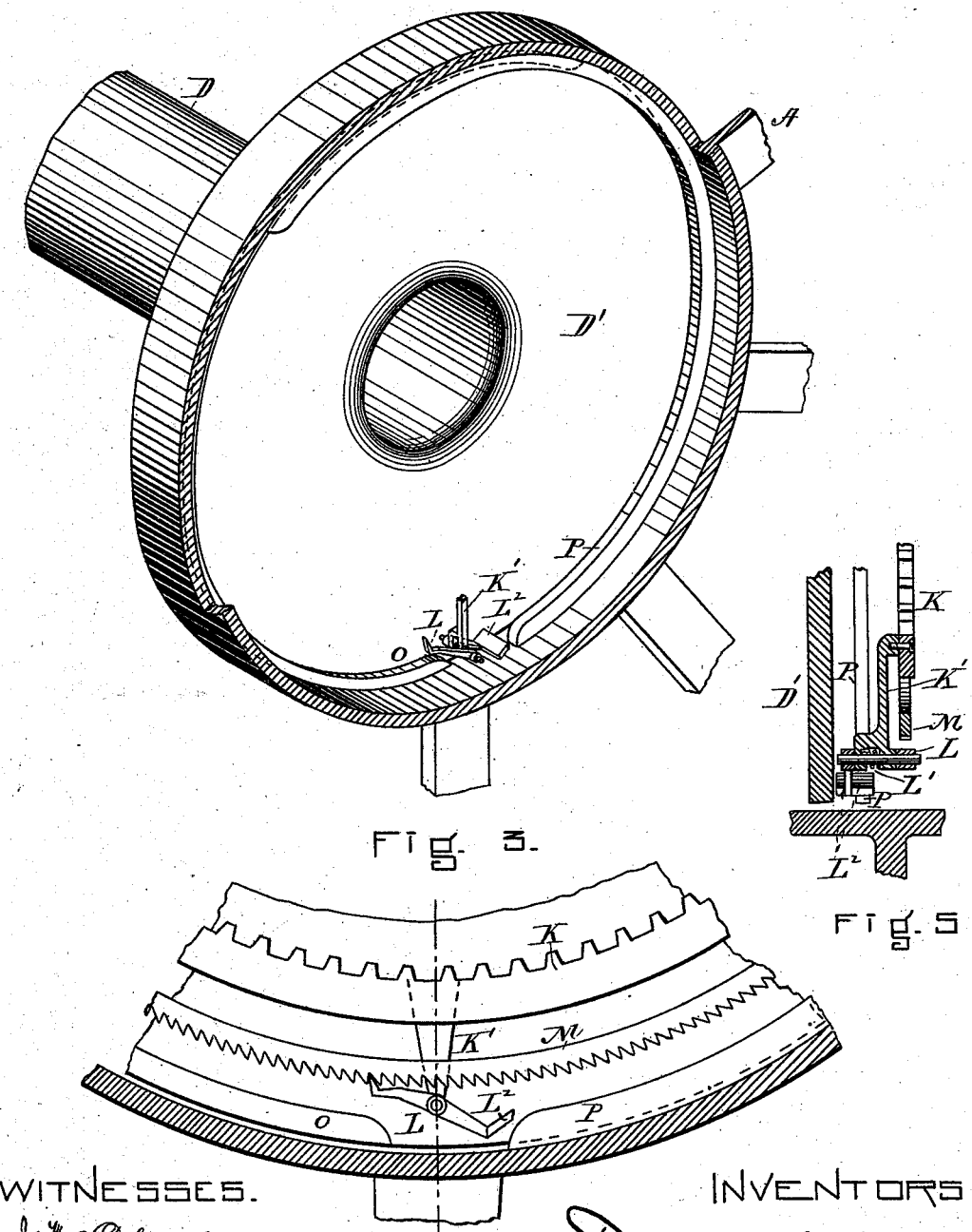

In the drawings, Figure 1 is a vertical transverse section of the apparatus. Fig. 2 is a section upon the line $x\ x$ of Fig. 1. Fig. 3 is a perspective from the section-plane $y\ y$ of Fig. 1; and Figs. 4 and 5 are sectional details, on an enlarged scale, of portions of the apparatus.

In considering the question of measuring power difficulty has always been experienced because of the assumption on the part of most of the users and sellers of power that the time element should be considered, and, therefore, that the power should be sold as horsepower, or, in other words, as a constant delivery of a certain number of foot-pounds a minute. This time element, whenever it is of any importance, can readily be observed independently from a clock; but it is usually of no great consequence, because in many instances the quantity of power can be accurately measured by the delivery of foot-pounds without regard to the time in which they are delivered. This machine, therefore, is intended to weigh and register the number of delivered foot-pounds.

We interpose between the driving-pulley and the driven shaft, or between a driving-shaft and a driven shaft, a torsion-spring, which, of course, will weigh constantly the power required to drive the driven shaft. If, then, there be arranged in the machine an apparatus which shall during a portion of each revolution be engaged with a counter for a portion of a revolution corresponding to the load upon the driven shaft, it is obvious that the amount of load carried during the revolution of the machine will be accurately weighed and registered, as by a proper adjustment between the spring and the counter this load can be registered in foot-pounds.

We accomplish this by arranging within the machine a pair of cams, one of which is connected with the driving-shaft, the other of which is connected with the driven shaft, and the separation of which allows a gap to exist between the ends of the cams, into which gap drops a trip connected with a gripping-pawl which drives an actuating-wheel connected with the register, on which register the revolutions of the wheel are registered. This gripping-pawl is tripped and held away from the wheel that actuates the register except at the interval between the two cams. The drawings illustrate a system of doing this, which, however, may be varied in many particulars without departing from the spirit of the invention.

It is obvious that power may be received either from the shaft or from the pulley, or that the shaft may be divided and one part of it attached to the pulley-sleeve, while the other part is attached to the shaft-sleeve, and still embody the whole of the present invention. For simplicity's sake, however, we assume that power delivered upon the surface of a pulley and transmitted by it to a shaft is to be measured and accounted for.

Referring now to the drawings, A is the pulley, and B is the shaft to which the power received upon the pulley is to be transmitted. The web of the pulley is continued inward toward the center and merges in a hub, A'. (Shown in Fig. 1.) Firmly fixed upon the shaft B is a sleeve, E', to which is made fast an outer sleeve, D, which is furnished with a web, D'. A spring, E, is made fast at one end to the sleeve D, and through the sleeve E' to the shaft B. The other end of this spring E is made fast to the web of the pulley A A', as shown in Fig. 2. This spring should be of tolerably stout wire and have not less than eighteen coils. Upon the end of the hub A' is mounted a gear, C, which has a handle, C', adapted to be fastened in any desired position to hold said gear stationary. This gear C meshes into the gear F, which is carried upon the web of the pulley A, and of course in its revolution around the shaft B is moved by its engagement with the fixed gear C.

Upon the arbor of the gear F is carried the pinion F', which meshes into the gear I, which carries the pinion I³, which pinion I³ meshes into the internal gear, K. The gear I and pinion I³ are mounted upon a slotted arm, I', which is attached to the surface of the web of the pulley A by the screw I². By taking out this gear I or pinion I³ and substituting in place of them either a gear with a greater number of teeth, or a pinion of a greater number of teeth, or a gear with a less number of teeth, or a pinion of a less number of teeth, the proportion of movement to the internal gear, K, can be regulated with regard to the strength of the spring E, so that the machine is adjustable, as may be desired. In case the new gear or pinion does not satisfactorily mesh with the pinion or gear which is not removed, both pinion and gear will require to be removed and replaced. This internal gear, K, is held in place by the screw-heads K². It carries at one point in its periphery an arm, K', on the end of which arm is a pawl, L. This pawl may be a gripping-pawl or a pawl which engages with ratchet-teeth. This pawl L has upon its shank a torsion-spring, L', (shown in Fig. 5,) which throws it downward toward its engagement with the ratchet-teeth of the ratchet-rim M. This ratchet-rim is free to move under the screw-heads K².

The pawl L is, as shown in Figs. 3 and 4, provided with a tripping-tail, L², which tail is adapted to engage with the cams O and P, (shown in Fig. 3,) one of which cams, P, is on the pulley A, and the other of which, O, is on the web D' of the shaft-sleeve D. These cams O and P should extend from one-half to two-thirds around the internal circumference of the wheels or webs to which they are attached. As one of these cams is connected with one end of the spring E and the other of these cams is connected with the other end of said spring, it is obvious that any tension given to the spring will separate the ends of the cams O P from each other, as shown in Fig. 3. When so separated, if the tail L² of the cam L comes in its revolution to the point of separation, it is obvious it will drop into this point of separation, and the point of the pawl L will engage with the ratchet-teeth of the wheel M and move them along coincident with the movement of the internal gear, K, until the tail L² of the pawl L reaches the point of the other internal cam, O, when it will be thrown out of gear, and the ratchet-rim M will cease to coincide in its revolution with the internal gear, K, until the internal gear, K, has sufficiently gained to bring the tail L² of the pawl L opposite the gap between the cams O and P, when it will again engage with those cams. A pin, M', Fig. 2, on the ratchet-rim M strikes once in each revolution against the tail N of the actuating-arm of a register, N'. This register N' is an ordinary counter, and need not be further described. With such a mechanism as this, the addition of a sewing-machine to the load of a shaft can be readily recognized and its value measured with a spring of eighteen coils of five-eighths-inch square wire and an average consumption of power of two horse or sixty-six thousand foot-pounds a minute. It is proposed to cause the register to work upon units of one hundred thousand pounds, although any other number of foot-pounds can be selected, if desired. As this mechanism may be embodied in a torsion-spring clutch which drives a shaft from another placed endwise to it, a driving or driven shaft is considered not merely the equivalent of a driving or driven pulley, but identical with it for the purpose of this invention. As the pawl-and-ratchet device is a mere form of positive engagement between the rim K and the register N'—the most convenient, perhaps, but not an essential form—it will be proper to style this connection a "clutch." As the rim K carries this clutch, it will be best designated as the "actuating-rim," and as the rim M is the first member of the registering train it may be well distinguished by the name "registering-rim."

This invention has been described as embodied with a torsion-spring dynamometer; but a dynamometer which employs a tension or compression spring or a lever and weight moved on a quadrant to measure the strain between the source of power and its place of application may be employed instead, the extension or compression of the spring or the movement of the lever serving to determine the duration of the engagement between the constantly-moved actuating-rim and the intermittingly-moved registering-rim. Such a substitution would be the use of an equivalent. The pawl described is intermittingly engaged with the registering-rim by positive action; but it is obvious that a pawl or clamp which was automatically engaged and positively disengaged at appropriate intervals would serve the same purpose in substantially the same way of engagement and disengagement; also, it is clear that the counter might be put on a fixed stand without material departure from the invention as described.

Having thus fully described our invention, we claim and desire to secure by Letters Patent of the United States—

1. A pulley, a shaft, and an interposed torsion-spring, in combination with each other, and in further combination with a registering mechanism integral therewith, and an actuating mechanism driven from a stationary gear concentric with said shaft and with two cams severally fastened to said shaft or pulley and automatically separated at their ends, according to the torsion of the spring, and with an automatic clutch connected with said stationary gear and adapted to engage with and drive the registering mechanism, all substantially as and for the purpose described.

2. The combination of a driving-pulley, a driven shaft, and a torsion-spring between them, one end of which is fast to the driving member of the train, and the other end of which is fast to the driven member of the train, and an actuating-rim mounted concentrically around the center of revolution of said mechanism revolved with it, and also constantly and differentially revolved relatively to it around the common center, according to the speed of revolution of the said mechanism, and a registering-rim mounted concentrically around the same center of revolution, revolved with it, and intermittingly and differentially revolved in relation to it in each revolution through an angular distance corresponding to the moment of stress of the torsion-spring between the driving and the driven member of the mechanism, and an intermittently-actuated clutch which connects the actuating and registering rims in their revolution for an angular distance corresponding to the moment of stress of said torsion-spring, substantially as and for the purpose described.

3. In combination with a driving-pulley and a driven shaft connected together by a torsion-spring, a pair of cams concentric with the center of revolution of said shaft and pulley, one of which pair of cams is in fixed relation with the driving and the other of which pair of cams is in fixed relation with the driven member of the mechanism, and an automatic tripping-clutch actuated by said cams, and a registering-rim, substantially as and for the purpose described.

4. A power-register containing a torsion-spring interposed between the driving and driven members of a power-transmitting mechanism, a pair of cams, one of which is in fixed relation with the driving mechanism and the other of which is in fixed relation with the driven mechanism, the distance of which cams from each other measures the stress of the torsion-spring, an actuating-rim independently and continuously revolved relatively to and differentially from the said driving and driven mechanisms, an automatic clutch carried by said actuating-rim and thrown into and out of engagement by said cams for a greater or less proportion of each revolution, according to their separation, and a registering-rim actuated by said clutch independently, differentially, and intermittently revolved for a fraction of a revolution, according to the stress of the torsion-spring, all in combination with each other, substantially as described.

5. The combination of a transmitting-dynamometer, a train of gearing actuated by the revolution thereof and moved at a proportional speed, a registering-rim independent of said train of gearing, but automatically engaged with it and moved by it at intervals, which correspond in angular distance with and are proportional to the strain between the driving and driven members of said dynamometer, and a counter which records the revolutions of said registering-rim, substantially as described.

6. The combination of the transmitting-dynamometer, one member of which drives an actuating-pawl, with said actuating-pawl moved at a proportional speed, and with a registering-rim moved by said actuating-pawl and engaged therewith automatically at intervals and for periods which correspond in angular distance with and are proportional to the strain between the driving and the driven members of the dynamometer, and a counter which registers the revolutions of the registering-rim, substantially as described.

FRANK M. CLARK.
FRED R. LOW.

Witnesses:
F. F. RAYMOND, 2d,
J. M. DOLAN.